United States Patent
Ramesh et al.

(10) Patent No.: US 6,777,519 B2
(45) Date of Patent: Aug. 17, 2004

(54) WATER-BASED ACRYLIC EMULSION DISPERSANTS UTILIZED AS GRIND RESINS FOR PIGMENTS AND METHOD OF PREPARING THE SAME

(75) Inventors: Swaminathan Ramesh, Canton, MI (US); JoAnn Lanza, Southfield, MI (US); Paul J. Harris, West Bloomfield, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 10/619,772

(22) Filed: Jul. 15, 2003

(65) Prior Publication Data

US 2004/0048959 A1 Mar. 11, 2004

Related U.S. Application Data

(62) Division of application No. 09/747,472, filed on Dec. 22, 2000, now Pat. No. 6,642,338.

(51) Int. Cl.$^7$ ............................................. C08F 120/10
(52) U.S. Cl. ..................... 526/318; 526/319; 526/332; 526/347; 524/558
(58) Field of Search ................................ 526/318, 319, 526/332, 347; 524/558

(56) References Cited

U.S. PATENT DOCUMENTS

| | | | |
|---|---|---|---|
| 3,671,502 A | 6/1972 | Samour et al. | 260/79.3 MU |
| 4,615,813 A | 10/1986 | Bretz | 252/8.514 |
| 4,774,303 A | 9/1988 | Denzinger et al. | 526/212 |
| 4,872,916 A | 10/1989 | Latosky | 106/503 |
| 5,266,622 A | 11/1993 | Mazanek et al. | 524/131 |
| 5,389,134 A | 2/1995 | Carpenter et al. | 106/404 |
| 5,603,865 A | 2/1997 | DePue et al. | 252/313.1 |
| 5,684,078 A | 11/1997 | Pfaffenschlager et al. | 524/457 |
| 5,786,420 A | 7/1998 | Grandhee | 525/7 |
| 5,847,065 A | 12/1998 | Krause et al. | 527/300 |
| 6,309,707 B1 * | 10/2001 | Mayer et al. | 427/386 |
| 6,346,591 B1 | 2/2002 | Ohrbom et al. | 526/312 |
| 6,403,709 B2 | 6/2002 | Ramesh et al. | 525/95 |
| 6,566,476 B2 | 5/2003 | Ohrbom et al. | 526/312 |
| 2002/0035289 A1 | 3/2002 | Walter et al. | 560/157 |
| 2002/0086966 A1 | 7/2002 | Weise et al. | 526/312 |
| 2002/0103319 A1 | 8/2002 | Ohrbom et al. | 526/312 |
| 2002/0132921 A1 | 9/2002 | Ramesh et al. | 525/88 |

FOREIGN PATENT DOCUMENTS

| | | | |
|---|---|---|---|
| DE | 3603392 | 8/1987 | C08F/20/06 |
| DE | 4225922 | 2/1994 | B01F/17/00 |
| EP | 340583 | 4/1989 | C09D/17/00 |
| EP | 330246 | 6/1989 | C08F/8/14 |
| EP | 718381 | 12/1995 | C09D/5/44 |
| GB | 2293373 | 9/1995 | B01F/17/14 |
| GB | 2305929 | 4/1997 | C09D/17/00 |
| WO | WO 88/02381 | 4/1988 | C08F/228/02 |

OTHER PUBLICATIONS

Ramesh, et al, 09/747,473 filed on Dec. 22, 2000, entitled Water–based coating composition having carbamate–melamine cross–linking, method of preparing the same and a cured film thereof, pp. 1–44, and the abstract.

Ohrbom, et al, 10/002,807 filed on Nov. 2, 2001, entitled Water–and organic–soluble carbamate Material, pp. 1–16.

International Search Report PCT/US 01/42956 dated Oct. 11, 2001.

English Abstract for DE4225922.

* cited by examiner

*Primary Examiner*—William Cheung

(57) ABSTRACT

The present invention is directed to a water-based acrylic emulsion dispersant to be used as a grind resin to incorporate inorganic pigment into a pigment dispersion for a coating composition. The acrylic emulsion dispersant is the reaction product of butyl methacrylate, butyl acrylate, styrene, methyl ether polyethylene glycol methacrylate, polyethylene glycol methacrylate, and polyphosphoric acid. The present invention is also directed to a method of preparing the acrylic emulsion dispersant. In this method, the butyl methacrylate, butyl acrylate, and styrene are combined with water to establish a first reaction blend. Similarly, the methyl ether polyethylene glycol methacrylate and the polyethylene glycol methacrylate are combined with water to establish a second reaction blend. Next, the first and second reaction blends are polymerized to form an intermediate emulsion polymer containing a hydroxyl group from the functionality of the polyethylene glycol methacrylate. Finally, the hydroxyl group from the polyethylene glycol methacrylate is reacted with polyphosphoric acid to form the acrylic emulsion dispersant which is utilized for efficient wetting and grinding of the pigment.

31 Claims, No Drawings

WATER-BASED ACRYLIC EMULSION DISPERSANTS UTILIZED AS GRIND RESINS FOR PIGMENTS AND METHOD OF PREPARING THE SAME

CROSS-REFERENCE TO RELATED APPLICATION

The present application is a divisional application of U.S. Ser. No. 09/747,472, filed on Dec. 22, 2000 now U.S. Pat. No. 6,642,338, which is incorporated herein by reference.

FIELD OF THE INVENTION

The subject invention generally relates to a pigment dispersion utilized in aqueous coating compositions. More specifically, the subject invention relates to water-based acrylic emulsion dispersants for an inorganic pigment and a method of preparing the acrylic emulsion dispersant.

BACKGROUND OF THE INVENTION

Aqueous coating compositions typically include a primary binder resin, a crosslinker, a pigment or pigments to improve the aesthetics of the coating composition, and other coating additives such as solvents, flow and appearance control agents, light-stabilizing additives, fillers such as extender pigment, and the like.

It is understood in the art that the pigment is incorporated into the aqueous coating compositions via a pigment dispersion. The pigment dispersion is derived from dispersion of the pigment into a grind resin. More specifically, a mill, such as a ball mill, grind mill, or continuous mill, is utilized to incorporate the pigment into the grind resin. The mill integrates the pigment into the grind resin until a desired particle size of the pigment is achieved, and until the pigment is appropriately wetted by the grind resin and uniformly dispersed throughout the grind resin.

The grind resins of the prior art have proven to be inadequate for use as a grind resin for dispersing pigment usable in aqueous coating compositions. The grind resins of the prior art are ineffective because these resins are unable to withstand mechanical forces exerted by the mill when integrating the pigment. These grind resins are also deficient in wetting the pigment and in maintaining the pigment dispersed throughout the grind resin. Instead, with the grind resins of the prior art, the pigment tends to coagulate or settle resulting in poor stability and inadequate 'shelf life' of the pigment dispersion.

These prior art grind resins also tend to have increased viscosities and, as understood in the art, increased viscosities typically inhibit the amount of pigment that can be incorporated into the grind resin. As a result, pigment dispersions that utilize the grind resins of the prior art cannot attain sufficient pigment-to-binder ratios while maintaining acceptable gloss and appearance in a film of the coating compositions. Also, due to the increased viscosity, these grind resins often require solvent and other additives which increase the overall volatile content of the pigment dispersion—a characteristic that is undesirable throughout the coating industry.

In sum, the prior art grind resins, as detailed above, are characterized by one or more inadequacies. Due to the inadequacies identified in the prior art, it is desirable to provide water-based acrylic emulsion dispersants to be utilized as grind resins for inorganic pigments and a method of preparing the water-based acrylic emulsions. It is advantageous that the acrylic emulsion dispersants according to the subject invention effectively wet the pigments, uniformly disperse the pigments, and provide increased pigment-to-binder ratios accompanied with acceptable gloss and appearance in the film of the coating composition.

SUMMARY OF THE INVENTION

A water-based acrylic emulsion dispersant is disclosed. The acrylic emulsion dispersant of the subject invention is utilized as a grind resin, also referred to as a grind emulsion resin, to incorporate inorganic pigment into a pigment dispersion for aqueous coating compositions. This acrylic emulsion dispersant is the reaction product of an ethylenically unsaturated monomer, a vinylaromatic hydrocarbon monomer, a non-functional polyalkylene glycol acrylate or methacrylate monomer, a functional polyalkylene glycol acrylate or methacrylate monomer having a hydroxyl group, and an acid having a first functional acid group reactive with the hydroxyl group, and a second functional acid group capable of providing an acid anion group.

A method of preparing the acrylic emulsion dispersant is also disclosed. According to this method, the ethylenically unsaturated monomer and the vinylaromatic hydrocarbon monomer are combined with water to establish a first reaction blend. A non-functional polyalkylene glycol acrylate or methacrylate monomer and a functional polyalkylene glycol acrylate or methacrylate monomer having the hydroxyl group are combined with water to establish a second reaction blend. Next, the first and second reaction blends are polymerized to form an intermediate emulsion polymer. The intermediate emulsion polymer contains the hydroxyl group which is then reacted with the acid to form the water-based acrylic emulsion dispersant of the subject invention.

More specifically, the second functional acid group of the acid is neutralized with an amine before the first functional acid group of the acid is reacted with the hydroxyl group in the intermediate emulsion polymer. After this neutralization, the first functional acid group reacts with the hydroxyl group in the intermediate emulsion polymer thereby bonding the acid, having the acid anion group, with the intermediate emulsion polymer to form the acrylic emulsion dispersant.

The general object of the subject invention is to develop a grind resin that effectively wets inorganic pigments used in aqueous coating compositions and that is capable of resisting mechanical forces introduced by the mills that are used to grind and integrate the inorganic pigments into the grind resin. In resisting the mechanical forces exerted by the mills, this grind resin is ideal in that it provides sufficient time for the mill to achieve ideal particle sizes of the inorganic pigments.

It is a further object of the subject invention to develop a grind resin that has a relatively low molecular weight and a correspondingly low viscosity such that increased pigment-to-binder ratios can be achieved while maintaining a low viscosity for the pigment dispersion. More specifically, as a result of the relatively low viscosity of the grind resin of the subject invention, higher concentrations of pigments can be incorporated into the grind resin to attain the increased pigment-to-binder ratios of the pigment dispersion. Due to the higher concentration of pigment, a solid, into the grind resin, the volatile content of the pigment dispersion, and of the overall coating composition, is decreased. Also, even at the increased pigment-to-binder ratios, this grind resin demonstrates superior dispersion stability through extended shelf life of the pigment dispersion, and this grind resin is able to be completely dispersed into water with little or no co-solvent required to promote dispersibility. This grind resin is also suitable for achieving optimal appearance characteristics, such as distinctiveness and gloss, in a film of the coating composition.

DETAILED DESCRIPTION OF THE INVENTION

The water-based acrylic emulsion dispersant of the subject invention is a 'primary' emulsion. By the term primary emulsion, it is to be understood that the subject invention is in a uniform, water-dispersed form with water being the only medium. The acrylic emulsion dispersant is utilized as a grind resin to incorporate inorganic pigment into a pigment dispersion for aqueous coating compositions. Examples of inorganic pigments that are utilized in aqueous coating compositions include, among other inorganic pigments, titanium dioxide, $TiO_2$, and iron oxide, FeO, as well as certain aluminum and mica flake pigments. It is to be understood that the terms acrylic emulsion dispersant and grind resin will be used interchangeably throughout the subject application. The acrylic emulsion dispersant includes both organic and inorganic chemical structure having various functionalities that promote efficient wetting of the inorganic pigment and optimal stability of the pigment in the grind resin of the pigment dispersion in the aqueous coating composition. These various functionalities will be introduced and discussed below.

The acrylic emulsion dispersant is generally the reaction product of an ethylenically unsaturated monomer, a vinylaromatic hydrocarbon monomer, a non-functional polyalkylene glycol acrylate or methacrylate, monomer, a functional polyalkylene glycol acrylate or methacrylate monomer having a hydroxyl group, and an acid having a first functional acid group reactive with the hydroxyl group, and a second functional acid group capable of providing an acid anion group. It is to be understood that the terminology of an ethylenically unsaturated monomer is intended to include both one ethylenically unsaturated monomer and more than one ethylenically unsaturated monomer. In fact, the preferred embodiment of the subject invention includes more than one ethylenically unsaturated monomer which will be described below.

The method of preparing the acrylic emulsion dispersant includes the steps of combining the ethylenically unsaturated monomer and the vinylaromatic hydrocarbon monomer with water to establish a first reaction blend, combining the non-functional polyalkylene glycol acrylate or methacrylate monomer and the functional polyalkylene glycol acrylate or methacrylate monomer having the hydroxyl group with water to establish a second reaction blend, polymerizing the first and second reaction blends to form an intermediate emulsion polymer containing the hydroxyl group, and reacting the hydroxyl group with the acid. The method steps of the subject invention are preferably conducted at temperatures between 25° C. and 100° C., more preferably between 50° C. and 100° C. This method will be described in further detail below.

The ethylenically unsaturated monomer is hydrophobic, i.e., insoluble in water, and in preparing the acrylic emulsion dispersant of the subject invention, the ethylenically unsaturated monomer is selected to promote miscibility between the acrylic emulsion dispersant and a binder resin of the aqueous coating composition. As appreciated by those skilled in the art, the binder resins of aqueous coating compositions are preferably either a polyacrylic or polyester binder resin. The ethylenically unsaturated monomer is also selected to achieve an ideal minimum film forming temperature, MFFT, for the acrylic emulsion dispersant, and ultimately for the film of the aqueous coating composition, such that the acrylic emulsion dispersant and the film are resistant to excessive cracking and chipping. The MFFT of the acrylic emulsion dispersant is preferably 0 to 15° C., more preferably 5 to 10°. The acrylic emulsion dispersant is further selected such that photo-sensitivity of the acrylic emulsion dispersant and of the film containing the acrylic emulsion dispersant is minimized.

The ethylenically unsaturated monomer is present in the acrylic emulsion dispersant in an amount from 5 to 30, preferably from 15 to 20, parts by weight based on 100 parts by weight of the acrylic emulsion dispersant, including water. In terms of the total monomer composition, the ethylenically unsaturated monomer is present in an amount from 30 to 60, preferably from 45 to 55, parts by weight based on 100 parts by weight of total monomer composition. It is to be understood that, in addition to the content of the ethylenically unsaturated monomer, the total monomer composition also includes the (content of the vinylaromatic hydrocarbon monomer, the non-functional polyalkylene glycol methacrylate monomer, and the functional polyalkylene glycol methacrylate monomer, all of which will be discussed in greater detail below.

The ethylenically unsaturated monomer is more specifically selected from the group of compounds consisting of aliphatic acrylates, aliphatic methacrylates, cycloaliphatic acrylates, cycloaliphatic methacrylates, and mixtures thereof. It is to be understood that each of the compounds, the aliphatic acrylates, the aliphatic methacrylates, the cycloaliphatic acrylates, and the cycloaliphatic methacrylates, include an alkyl radical. In the preferred embodiment of the subject invention, the alkyl radicals of these compounds include up to 20 carbon atoms. When selected as an ethylenically unsaturated monomer, the aliphatic acrylates are present in an amount from 15 to 30, preferably from 23 to 29, parts by weight based on 100 parts by weight of total monomer composition. Similarly, when the aliphatic methacrylates are selected as an ethylenically unsaturated monomer, these monomers are present in an amount from 15 to 30, preferably from 23 to 29, parts by weight based on 100 parts by weight of total monomer composition.

In the preferred embodiment, there is more than one type of ethylenically unsaturated monomer. The differing types of ethylenically unsaturated monomers are selected to balance the physical characteristics of the acrylic emulsion dispersant set forth above. That is, more than one type of the ethylenically unsaturated monomer balances the MFFT and establishes the desired crack and chip resistance as well as the desired photo-sensitivity of the acrylic emulsion dispersant, and of the film of the aqueous coating composition.

The aliphatic acrylates that may be selected as one of the ethylenically unsaturated monomers are selected from the group consisting of methyl acrylate, ethyl acrylate, propyl acrylate, butyl acrylate, hexyl acrylate, ethylhexyl acrylate, stearyl acrylate, lauryl acrylate, and mixtures thereof. The aliphatic methacrylates that may be selected as one of the ethylenically unsaturated monomers are selected from the group consisting of methyl methacrylate, ethyl methacrylate, propyl methacrylate, butyl methacrylate, hexyl methacrylate, ethylhexyl methacrylate, stearyl methacrylate, lauryl methacrylate, and mixtures thereof. The cycloaliphatic acrylate that may be selected as one of the ethylenically unsaturated monomers is cyclohexyl acrylate, and the cycloaliphatic methacrylate that may be selected as one of the ethylenically unsaturated monomers is cyclohexyl methacrylate.

In the preferred embodiment of the subject invention, there are two ethylenically unsaturated monomers, butyl methacrylate (BMA) and butyl acrylate (BA). For descriptive purposes, chemical representations of BMA and BA are respectively disclosed below.

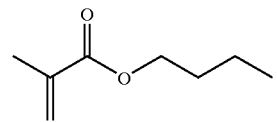 and

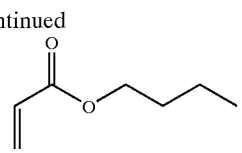

As with the ethylenically unsaturated monomer or monomers, the vinylaromatic hydrocarbon monomer is also hydrophobic, i.e., insoluble in water, and in preparing the acrylic emulsion dispersant, the vinylaromatic hydrocarbon monomer is also selected to promote miscibility between the acrylic emulsion dispersant and the binder resin of the aqueous coating composition. The vinylaromatic hydrocarbon monomer is also selected to establish the ideal MFFT and to control the photo-sensitivity for the acrylic emulsion dispersant and the film.

The vinylaromatic hydrocarbon monomer is present in the acrylic emulsion dispersant in an amount from 1 to 15, preferably from 3 to 9, parts by weight based on 100 parts by weight of the acrylic emulsion dispersant, including water. In terms of the total monomer composition, the vinylaromatic hydrocarbon monomer is present in an amount from 5 to 20, preferably from 10 to 15, parts by weight based on 100 parts by weight of total monomer composition. Furthermore, the molar ratio of the ethylenically unsaturated monomer to the vinylaromatic hydrocarbon monomer is from 1:1 to 10:1.

The vinylaromatic hydrocarbon monomer is more specifically selected from the group consisting of styrene, α-methylstyrene, vinyltoluene, diphenylethylene, and mixtures thereof. In the preferred embodiment of the subject invention, the vinylaromatic hydrocarbon monomer is styrene. For descriptive purposes, a chemical representation of styrene is disclosed below.

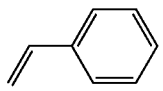

To prepare the acrylic emulsion dispersant, the ethylenically unsaturated monomer and the vinylaromatic hydrocarbon monomer are combined with water to establish the first reaction blend. As stated above, the ethylenically unsaturated monomers and the vinylaromatic hydrocarbon monomer are insoluble in water. As such, it is also necessary to add an anionic surfactant to the first reaction blend such that the ethylenically unsaturated monomer and the vinylaromatic hydrocarbon monomer become dispersed in, and can be incorporated into, the water. Preferably, a sulfonate-based surfactant is selected as the anionic surfactant. In terms of the preferred embodiment, the BMA and BA and styrene are combined with water and the anionic surfactant to establish the first reaction blend. In this embodiment, the molar ratio of the BMA and BA to styrene is 2.5:1.

The acrylic emulsion dispersant is also the reaction product of the non-functional polyalkylene glycol acrylate or methacrylate monomer. That is, it is to be understood that the acrylic emulsion dispersant may be the reaction product of either the non-functional polyalkylene glycol methacrylate monomer, and even mixtures thereof. However, as will be described in significant detail below, the acrylic emulsion dispersant is preferably the reaction product of the non-functional polyalkylene glycol methacrylate. As such, for descriptive purposes only, the subject invention will be described below only in terms of the non-functional polyalkylene glycol methacrylate and not the non-functional polyalkylene glycol acrylate.

The non-functional polyalkylene glycol methacrylate monomer is soluble and miscible in water and is of the general formula

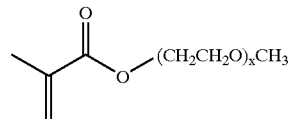

As shown above, the non-functional polyalkylene glycol methacrylate monomer includes an ethoxy group ($CH_2CH_2O$) which promotes the solubility and miscibility of the entire monomer in water. The ethoxy group of the non-functional polyalkylene glycol methacrylate monomer terminates with a non-functional, i.e., un-reactive, methyl group ($CH_3$). It is important that this monomer be non-functional to control the viscosity of the completed acrylic emulsion dispersant. The variable x in the general formula of the non-functional polyalkylene glycol methacrylate monomer can range from 5 to 50. The non-functional polyalkylene glycol methacrylate monomer is present in an amount from 1 to 15, preferably from 4 to 7, parts by weight based on 100 parts by weight of total monomer composition.

In the preferred embodiment, the non-functional polyalkylene glycol methacrylate monomer is methyl ether polyethylene glycol methacrylate (MPEGMA), and x is 6 resulting in a formula weight for the MPEGMA of approximately 350 amu (atomic mass units). For descriptive purposes, a chemical representation of the preferred non-functional monomer, MPEGMA, is disclosed below.

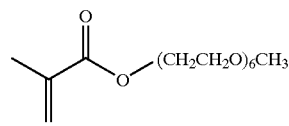

In alternative embodiments, where the non-functional polyalkylene glycol acrylate is selected, the preferred non-functional polyalkylene glycol acrylate is methyl ether polyethylene glycol acrylate.

The acrylic emulsion dispersant is also the reaction product of the functional polyalkylene glycol acrylate or methacrylate monomer having the hydroxyl group. That is, it is to be understood that the acrylic emulsion dispersant may be the reaction product of either the functional polyalkylene glycol acrylate monomer having the hydroxyl group, or the reaction product of the functional polyalkylene glycol methacrylate monomer having the hydroxyl group, and even mixtures thereof. However, as will be described in significant detail below, the acrylic emulsion dispersant is preferably the reaction product of the functional polyalkylene glycol methacrylate. As such, for descriptive purposes only, the subject invention will be described below only in terms of the functional polyalkylene glycol methacrylate and not the functional polyalkylene glycol acrylate.

In the context of the subject invention, the functional polyalkylene glycol methacrylate monomer is functional because this monomer includes a hydroxyl group. As with the non-functional polyalkylene glycol methacrylate monomer, the functional polyalkylene glycol methacrylate monomer is soluble and miscible in water. The functional monomer is of the general formula

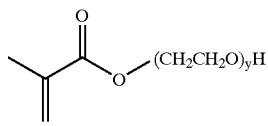

As shown above, the functional polyalkylene glycol methacrylate monomer includes an ethoxy group ($CH_2CH_2O$) which promotes the solubility and miscibility of the entire monomer in water. The ethoxy group of the functional polyalkylene glycol methacrylate monomer terminates with a functional, i.e., reactive, hydrogen atom thereby establishing the hydroxyl group of the functional monomer. The significance of this functional hydroxyl group will be described below. The variable y in the general formula of the functional polyalkylene glycol methacrylate monomer can range from 5 to 50. The functional polyalkylene glycol methacrylate monomer is present in an amount from 25 to 40, preferably from 27 to 30, parts by weight based on 100 parts by weight of total monomer composition. Furthermore, the molar ratio of the functional polyalkylene glycol methacrylate monomer with the hydroxyl group to the non-functional polyalkylene glycol methacrylate monomer is from 5:1 to 15:1. Of course, if the functional polyalkylene glycol acrylate monomer with the hydroxyl group and the non-functional polyalkylene glycol acrylate monomer are used, as would be in certain alternative embodiments, the above molar ratio, from 5:1 to 15:1 remains applicable.

The functional polyalkylene glycol methacrylate monomer is selected from the group consisting of polyethylene glycol methacrylate (PEGMA), polypropylene glycol methacrylate, and mixtures thereof. In the preferred embodiment, the functional polyalkylene glycol methacrylate monomer is PEGMA, and y is 7 resulting in a formula weight for the PEGMA of approximately 360 amu (atomic mass units). For descriptive purposes, a chemical representation the preferred functional monomer, PEGMA, is disclosed below.

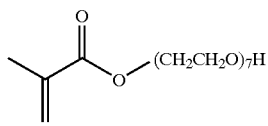

In alternative embodiments, where the functional polyalkylene glycol acrylate is selected, the preferred functional polyalkylene glycol acrylate is polyethylene glycol acrylate.

To prepare the acrylic emulsion dispersant, the non-functional polyalkylene glycol methacrylate monomer and the functional polyalkylene glycol methacrylate monomer having the hydroxyl groups are combined with water to establish the second reaction blend. Since, as stated above, both the non-functional polyalkylene glycol methacrylate monomer and the functional polyalkylene glycol methacrylate monomer are soluble in water, there is no need to add any of the anionic surfactant to the second reaction blend. In terms the preferred embodiment, the MPEGMA and the PEGMA are combined with water to establish the second reaction blend. In this embodiment, the molar ratio of the PEGMA to the MPEGMA is 10:1.

In addition to the above, an initiator, also known as a polymerization promoter, is incorporated into the second reaction blend to initiate an emulsion polymerization process which will be described below. The initiator is soluble in water and is selected from the group of inorganic persulfates consisting of ammonium persulfate, $(NH_4)_2S_2O_8$, potassium persulfate, $K_2S_2O_8$, and sodium persulfate, $Na_2S_2O_8$. Of course, other suitable initiators including, but not limited to, conventional inorganic peroxodisulfates and ammonium or alkali metal peroxydiphosphates can also be utilized to initiate the emulsion polymerization process.

Next, the first and second reaction blends are polymerized to form an intermediate emulsion polymer. More specifically, the first and second reaction blends are fed into a distinct reaction flask where polymerization forms the intermediate emulsion polymer. The intermediate emulsion polymer contains the hydroxyl group from the functional polyalkylene glycol methacrylate, in the preferred embodiment PEGMA. For descriptive purposes, a chemical representation of the

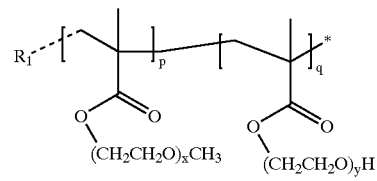

general formula of the intermediate emulsion polymer is disclosed below.

$R_1$ is a polymer chain as defined above. That is, $R_1$ contains monomers selected from the group consisting of ethylenically unsaturated monomers and vinylaromatic hydrocarbon monomers, and mixtures thereof, and the variables x and y range from 5 to 50 as described above. The variable p is indicative of the number of MPEGMA monomers in the complete polymer chain, and the variable q is indicative of the number of PEGMA monomers in the complete polymer chain. The variables p and q range from 1 to 100 which will be described further below.

In terms of the preferred embodiment, $R_1$ is specifically defined as follows:

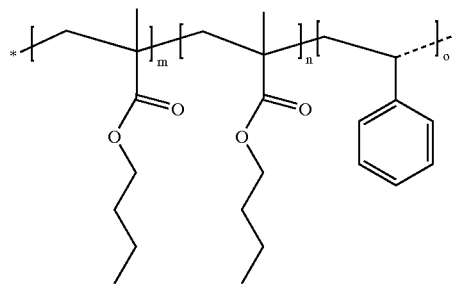

which includes BMA, BA, and styrene, and the variables m, n, and o varying from 1 to 100. It is to be understood that the variables m, n, and o are respectively indicative of the number of BMA, BA, and styrene monomers in the complete polymer chain. As such, the complete intermediate emulsion polymer, in terms of the preferred embodiment, appears as disclosed below.

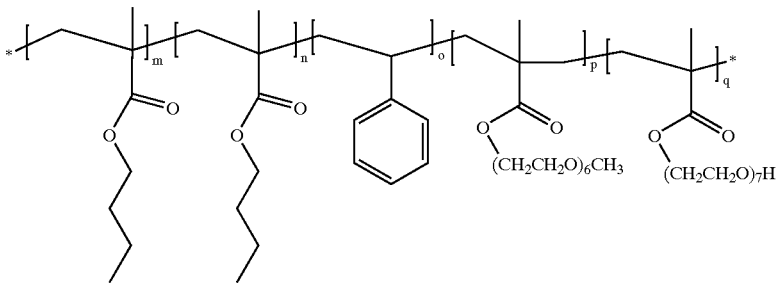

In this preferred embodiment, the variables m, n, o, p, and q more specifically range from 5 to 20 such that there are, on average, 100 monomers per polymer chain. Of course, the number of monomers per polymer chain drives the molecular weight of the acrylic emulsion dispersant as will be described below.

To control the extent of polymerization and thus the molecular weight during the emulsion polymerization process, the subject invention utilizes a water-soluble, chain transfer agent. The chain transfer agent can either be incorporated into the second reaction blend, with the MPEGMA, PEGMA, and water, or the chain transfer agent can be incorporated into the polymerization reaction flask that the first and second reaction blends are fed into. The chain transfer agent is a mercaptan, i.e., a thiol, of the general formula $R_2$—SH, wherein $R_2$ is a hydrocarbon chain. Preferably, the mercaptan is selected from the group consisting of ethyl mercaptan and 2-nonanethiol, and mixtures thereof. Other suitable chain transfer agents include polyhalogen compounds. The chain transfer agent of the subject invention controls the number of monomers per polymer chain such that the variables m, n, o, p, and q range from 5 to 20 and there are, on average, 100 monomers per polymer chain.

After the intermediate emulsion polymer is formed, the acid is reacted with the hydroxyl group in the intermediate emulsion polymer from either the functional polyalkylene glycol acrylate or methacrylate. More specifically, it is the first functional acid group of the acid that is reacted with the hydroxyl group. The first functional acid group reacts with the hydroxyl group such that a bond is established between the oxygen atom in the hydroxyl group of the intermediate emulsion polymer and the acid.

However, it is preferred that prior to the reaction between the first functional acid group and the hydroxyl group in the intermediate emulsion polymer, the second functional acid group of the acid is neutralized with an amine such that the second functional acid group provides the acid anion group, $O^-$. The acid anion group, as will be discussed further below, interacts with metal centers that are inherent in inorganic pigments to anchor the pigment or pigments in the pigment dispersion.

In view of the above requirements for the first and second functional acid groups, the acid is selected from the group consisting of polyphosphoric acid, sulfuric acid, sulfurous acid, and dicarboxylic acids. Suitable dicarboxylic acids include, but are not limited to, oxalic acid, malonic acid, succinic acid, glutaric acid, and mixtures thereof.

Of course, it is to be considered equivalent that the hydroxyl group of the intermediate emulsion polymer can alternatively be reacted with suitable carboxylic acid anhydrides including, but not limited to, maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof. The ring structure in these anhydrides will open upon reaction with the hydroxyl group, and have the second functional acid group remaining which then can provide the acid anion group upon neutralization with the amine.

In the preferred embodiment, the acid is polyphosphoric acid which has three hydroxyl groups. The polyphosphoric acid is reacted with the hydroxyl group from the functional polyalkylene glycol acrylate or methacrylate in the intermediate emulsion polymer. However, as discussed above, before the polyphosphoric acid of the preferred embodiment and the intermediate emulsion polymer are reacted, the polyphosphoric acid is neutralized with the amine. The amine is reacted with the polyphosphoric acid in a molar ratio of two moles of amine for every one mole of polyphosphoric acid. It is understood in the art that polyphosphoric acid includes both an $H_3PO_4$ chemical component and a $P_2O_5$ chemical component. The amine is selected from the group consisting of dimethylethanolamine and amino methyl propanol, and mixtures thereof. Preferably, the amine is dimethylethanolamine, $(CH_3)_2NCH_2CH_2OH$. Other amines suitable in the subject emulsion polymerization process include, but are not limited to $NH_3$ and alkyl amines such as diethylamine.

For descriptive purposes, a chemical representation of the $H_3PO_4$ chemical component of the polyphosphoric acid is disclosed below.

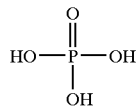

Specifically, two of the three hydroxyl groups of the polyphosphoric acid function as second functional acid groups and are neutralized with the amine to provide the acid anion groups prior to reacting the hydroxyl group in the intermediate emulsion polymer with the polyphosphoric acid. After this neutralization step, the phosphoric acid is in the following ionic form having two acid anion groups.

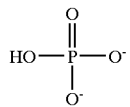

Next, the one hydroxyl group of the polyphosphoric acid that remains un-neutralized by the amine, i.e., the first functional acid group of the polyphosphoric acid, is reacted with the hydroxyl group in the intermediate emulsion polymer from the functional polyalkylene glycol acrylate or methacrylate such that the bond is established between the intermediate emulsion polymer and the polyphosphoric acid to form the completed acrylic emulsion dispersant. More specifically, the bond is established between the phosphorus atom of the polyphosphoric acid and the oxygen atom from hydroxyl group of the terminal ethoxy group in the functional polyalkylene glycol acrylate or methacrylate. In terms of the preferred embodiment, the one hydroxyl group of the polyphosphoric acid that remains un-neutralized, i.e., the first functional acid group, is reacted with the hydroxyl group in the intermediate emulsion polymer from the PEGMA. For descriptive purposes, a chemical representation of a general formula of the completed acrylic emulsion dispersant is disclosed below.

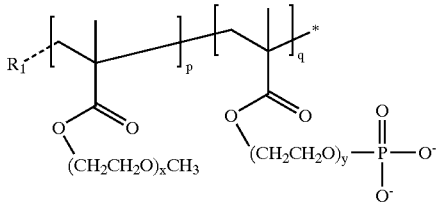

All variables are defined as above. In terms of the preferred embodiment, including the BMA, the BA, the styrene, the MPEGMA, the PEGMA, and the polyphosphoric acid, a chemical representation is disclosed below.

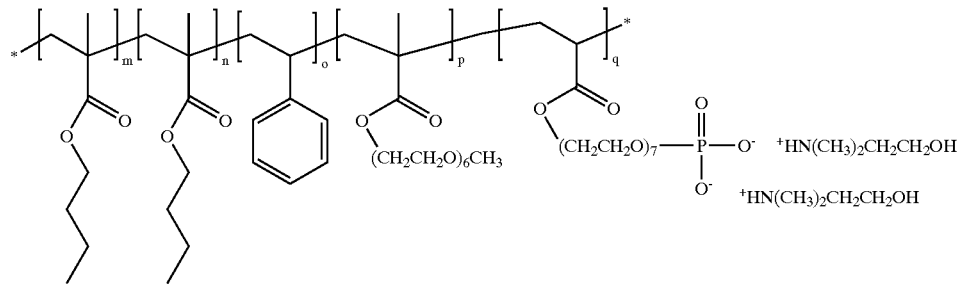

Notice in this chemical representation, the completed acrylic emulsion dispersant has acid functionality, with two acid anion groups, and the preferred amine, dimethylethanolamine, remains in the reaction in cationic form.

The completed acrylic emulsion dispersant includes, on average, 100 monomers and has a weight-average molecular weight, $M_w$, of from 10,000 to 100,000. Preferably, the molecular weight is from 10,000 to 40,000, and more preferably, from 10,000 to 17,000. The completed acrylic emulsion dispersant has a number-average molecular weight, $M_n$, of 10,000 or less. Additionally, the acrylic emulsion dispersant of the subject invention has a non-volatile content of from 20 to 40, preferably from 25 to 35, percent non-volatile by weight. This acrylic emulsion dispersant is also completely hydrophilic such that it can be in the uniform, water-dispersed form that is characteristic of primary emulsions.

Pigment dispersions utilizing this acrylic emulsion dispersant have pigment-to-binder ratios exceeding 30, preferably from 30 to 40 with pigment particles having a particle size of less than six microns. That is, the grind resin of the subject invention is robust enough to permit the inorganic pigments dispersed within to be ground or milled long enough to achieve pigment particle sizes of less than six microns without degradation and coagulation of the grind resin. Of course, it is to be understood that other pigment dispersions utilizing this acrylic emulsion dispersant may also have pigment-to-binder ratios less than 30. Furthermore, pigment dispersions utilizing this acrylic emulsion dispersant have viscosities of less than 80 Krebs units. The viscosities of these pigment dispersions were measured after thirty minutes of mixing with a Cowles blade at approximately 3000 RPM and at 75 to 85° F.

The resulting structure of the completed acrylic emulsion dispersant of the subject invention essentially. 'anchors' the inorganic pigment in the pigment dispersion thereby maintaining the pigment uniformly dispersed throughout the grind resin. More specifically, the acid functionality, or the acid anion groups, of the completed acrylic emulsion dispersant physically interacts with the metal centers inherent in inorganic pigments by complex or coordinated covalent bonding. This physical interaction keeps the pigment uniformly dispersed throughout the grind resin. Also, as discussed above, the selection of monomers, in particular the selection of the ethylenically unsaturated monomers and the vinylaromatic hydrocarbon monomers, promotes thorough miscibility between the acrylic emulsion dispersant and the binder resin of the aqueous coating composition.

It is to be understood that all of the preceding chemical representations are merely two-dimensional chemical representations and that the structure of these chemical representations may be other than as indicated. It is also to be understood that although the chemical representations disclosed above that relate to the structure of the polymer chain indicate that the completed acrylic emulsion dispersant has specific 'blocks' of monomers, in reality, the monomers are randomly distributed throughout the polymer based on the molar ratios of the monomers as well as the relative reactivity realized between the discrete monomer components.

The following examples illustrating the formation of and the use of the acrylic emulsion dispersant of the subject invention, as presented herein, are intended to illustrate and not limit the invention.

EXAMPLES

Example 1

The acrylic emulsion dispersant was prepared by adding and reacting the following parts, by weight, unless otherwise indicated.

TABLE 1

| Reactant | Targeted Amount (moles) | Actual Amount (grams) | Other |
|---|---|---|---|
| Butyl Methacrylate [BMA] | .692 | 99.3 | — |
| Butyl Acrylate [BA] | .690 | 88.7 | — |
| Styrene | .560 | 56.3 | — |
| [MPEGMA] | .027 | 9.4 | — |
| [PEGMA] | .278 | 102.2 | Total Monomer Composition equal to 355.9 grams |

TABLE 1-continued

| | | | |
|---|---|---|---|
| $(NH_4)_2S_2O_8$ [Initiator] | N/A | 1.16 | 0.3 wt. % of the Total Monomer Composition |
| Anionic Surfactant | N/A | 22.7 | 1.3 wt. % of the Total Monomer Composition 22.7 grams of a 20% aqueous soln. of the Anionic Surfactant (4.54 grams of Anionic Surfactant and 18.16 grams of $H_2O$) |
| Mercaptan | N/A | 7.5 | 2.0 wt. % of the Total Monomer Composition |
| Water [de-ionized water] | N/A | 833.3 | — |
| TOTAL | N/A | 1220.56 | — |
| | | | Intermediate Emulsion Polymer is formed |
| Polyphosphoric Acid | .095 | 47.2 | 47.2 grams of a 20% aqueous soln. of the Polyphosphoric acid (10.1 grams $H_3PO_4$ and 37.1 grams $H_2O$) |
| Dimethylethanolamine [DMEA] | .190 | 84.7 | 84.7 grams of a 20% aqueous soln. of the DMEA (17.1 grams DMEA and 67.6 grams $H_2O$) |

Per the above table, Table 1, 99.3 grams of BMA and 88.7 grams of BA and 56.3 grams of styrene and 13.8 grams of anionic surfactant were combined with 278.8 grams of water to establish the first reaction blend. 9.4 grams of MPEGMA and 102.2 grams of PEGMA and 1.16 grams of Initiator were combined with 276.5 grams of water to establish the second reaction blend. Also, 7.5 grams of mercaptan were added to the second reaction blend. Next, a distinct polymerization reaction flask was prepared with 8.9 grams of Anionic Surfactant and 278.0 grams of water, and the first and second reaction blends were polymerized to form the intermediate emulsion polymer in the polymerization reaction flask. More specifically, the first and second reaction blends were dual-fed into the polymerization reaction flask, already including the Anionic Surfactant and the water, for approximately two hours to from the intermediate emulsion polymer. Throughout the two hour dual-feed, the polymerization reaction flask was heated via a conventional heat supply to a temperature of 80° C. After the two hour dual-feed, the polymerization reaction flask was maintained at 80° C. for an additional two hours, now totaling approximately four hours, and then the heat supply was suspended.

Once the intermediate emulsion polymer was formed, 84.7 grams of a 20% aqueous solution of DMEA were reacted with 47.2 grams of a 20% aqueous solution of polyphosphoric acid to neutralize two of the three hydroxyl groups of the polyphosphoric acid and form the acrylic emulsion dispersant of the subject invention. Then the neutralized polyphosphoric acid was added to the intermediate emulsion polymer in the polymerization reaction flask to react the hydroxyl group of the polyphosphoric acid that remained un-neutralized by the amine with the hydroxyl group in the intermediate emulsion polymer from the functional polyalkylene glycol methacrylate.

The completed acrylic emulsion dispersant has a pH value of 8.16 at 25° C., and an acid number, determined by conventional methods, of 39 indicative of the content of $H_3PO_4$ in the completed acrylic emulsion dispersant. Under GPC analysis, the $M_n$ and $M_w$ of the subject dispersant were 4,110 and 15,330, respectively.

Example 2

The completed acrylic emulsion dispersant was then incorporated into a modified pigment dispersion according to the following table, Table 2.

TABLE 2

| Pigment Dispersion Component (modified) | Amount (grams) | Other |
|---|---|---|
| ACRYLIC EMULSION DISPERSANT | 211.0 | — |
| water [de-ionized water] | 207.0 | — |
| co-solvent [propyl propasol] | 48.0 | — |
| pigment [titanium dioxide, $TiO_2$] | 939.0 | Added pigment gradually over time and under stirring |
| defoaming additive | 0.29 | — |
| Appearance Evaluation | N/A | Glossy appearance of modified pigment dispersion on a 2 mil thickness drawdown |

Per the above table, Table 2, 211.0 grams of the acrylic emulsion dispersant and 207.0 grams of de-ionized water and 48.0 grams of propyl propasol and 0.29 grams of a defoaming additive were added together to prepare a modified pigment dispersion for an aqueous coating composition. Next, 939.0 grams of $TiO_2$ pigment were added gradually over time and under stirring to the acrylic emulsion dispersant/the de-ionized water/propyl propasol blend.

The appearance of the modified pigment dispersion was evaluated by a 2 mil thickness drawdown. The evaluation of the modified pigment dispersion utilizing the acrylic emulsion dispersant of the subject invention concluded a glossy appearance with slight aeration. Additionally, the particle size of the modified pigment dispersion was determined utilizing a standard grind gauge method. No pigment particles were observed thereby indicating that the pigment particle size is less than six microns according to the standards of the grind gauge method. The pigment-to-binder ratio of this modified pigment dispersion was 15.34, and this modified pigment dispersion had a viscosity of 60 Krebs units after thirty minutes of mixing with a Cowles blade at approximately 3001 RPM and at 75° F.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A water-based acrylic emulsion dispersant for efficient wetting and grinding of a pigment, said acrylic emulsion dispersant comprising the reaction product of:
   an ethylenically unsaturated monomer;
   a vinylaromatic hydrocarbon monomer;
   a non-functional polyalkylene glycol acrylate or methacrylate monomer, a functional polyalkylene glycol acrylate or methacrylate monomer having a hydroxyl group; and
   an acid having a first functional acid group reactive with said hydroxyl group, and a second functional acid group capable of providing an acid anion group.

2. An acrylic emulsion dispersant as set forth in claim 1 further comprising an amine for neutralizing said second functional acid group to provide said acid anion group.

3. An acrylic emulsion dispersant as set forth in claim 2 wherein said amine is selected from the group consisting of dimethylethanolamine and amino methyl propanol, and mixtures thereof.

4. An acrylic emulsion dispersant as set forth in claim 1 wherein said ethylenically unsaturated monomer is present in an amount from 30 to 60 parts by weight based on 100 parts by weight of total monomer composition.

5. An acrylic emulsion dispersant as set forth in claim 1 wherein said ethylenically unsaturated monomer is selected from the group of compounds consisting of aliphatic acrylates, aliphatic methacrylates, cycloaliphatic acrylates, cycloaliphatic methacrylates, and mixtures thereof, each of said compounds having up to 20 carbon atoms in the alkyl radical.

6. An acrylic emulsion dispersant as set forth in claim 5 wherein said aliphatic acrylates are selected from the group consisting of methyl acrylate, ethyl acrylate, propyl acrylate, butyl acrylate, hexyl acrylate, ethylhexyl acrylate, stearyl acrylate, lauryl acrylate, and mixtures thereof.

7. An acrylic emulsion dispersant as set forth in claim 5 wherein said aliphatic acrylates are present in an amount from 15 to 30 parts by weight based on 100 parts by weight of total monomer composition.

8. An acrylic emulsion dispersant as set forth in claim 5 wherein said aliphatic methacrylates are selected from the group consisting of methyl methacrylate, ethyl methacrylate, propyl methacrylate, butyl methacrylate, hexyl methacrylate, ethylhexyl methacrylate, stearyl methacrylate, lauryl methacrylate, and mixtures thereof.

9. An acrylic emulsion dispersant as set forth in claim 5 wherein said aliphatic methacrylates are present in an amount from 15 to 30 parts by weight based on 100 parts by weight of total monomer composition.

10. An acrylic emulsion dispersant as set forth in claim 5 wherein said cycloaliphatic acrylate is further defined as cyclohexyl acrylate.

11. An acrylic emulsion dispersant as set forth in claim 5 wherein said cycloaliphatic methacrylate is further defined as cyclohexyl methacrylate.

12. An acrylic emulsion dispersant as set forth in claim 1 wherein said vinylaromatic hydrocarbon monomer is selected from the group consisting of styrene, α-methylstyrene, vinyltoluene, diphenylethylene, and mixtures thereof.

13. An acrylic emulsion dispersant as set forth in claim 1 wherein said vinylaromatic hydrocarbon monomer is present in an amount from 5 to 20 parts by weight based on 100 parts by weight of total monomer composition.

14. An acrylic emulsion dispersant as set forth in claim 1 wherein said non-functional polyalkylene glycol methacrylate monomer is further defined as methyl ether polyethylene glycol methacrylate.

15. An acrylic emulsion dispersant as set forth in claim 1 wherein said non-functional polyalkylene glycol methacrylate monomer is present in an amount from 1 to 15 parts by weight based on 100 parts by weight of total monomer composition.

16. An acrylic emulsion dispersant as set forth in claim 1 wherein said non-functional polyalkylene glycol acrylate monomer is present in an amount from 1 to 15 parts by weight based on 100 parts by weight of total monomer composition.

17. An acrylic emulsion dispersant as set forth in claim 1 wherein said functional polyalkylene glycol methacrylate monomer having a hydroxyl group is selected from the group consisting of polyethylene glycol methacrylate, polypropylene glycol methacrylate, and mixtures thereof.

18. An acrylic emulsion dispersant as set forth in claim 1 wherein said functional polyalkylene glycol methacrylate monomer having a hydroxyl group is present in an amount from 25 to 40 parts by weight based on 100 parts by weight of total monomer composition.

19. An acrylic emulsion dispersant as set forth in claim 1 wherein said functional polyalkylene glycol acrylate monomer having a hydroxyl group is present in an amount from 25 to 40 parts by weight based on 100 parts by weight of total monomer composition.

20. An acrylic emulsion dispersant as set forth in claim 1 wherein the molar ratio of said ethylenically unsaturated monomer to said vinylaromatic hydrocarbon monomer is from 1:1 to 10:1.

21. An acrylic emulsion dispersant as set forth in claim 1 wherein the molar ratio of said functional polyalkylene glycol methacrylate monomer having a hydroxyl group to said non-functional polyalkylene glycol methacrylate monomer is from 5:1 to 15:1.

22. An acrylic emulsion dispersant as set forth in claim 1 wherein said acid having said first and second functional acid groups is selected from the group consisting of polyphosphoric acid, sulfuric acid, sulfurous acid, and dicarboxylic acids.

23. An acrylic emulsion dispersant as set forth in claim 1 having a molecular weight of from 10,000 to 100,000.

24. An acrylic emulsion dispersant as set forth in claim 1 having a non-volatile content of from 20 to 40 percent non-volatile by weight.

25. A water-based acrylic emulsion dispersant for efficient wetting and grinding of a pigment, said acrylic emulsion dispersant being of the general formula:

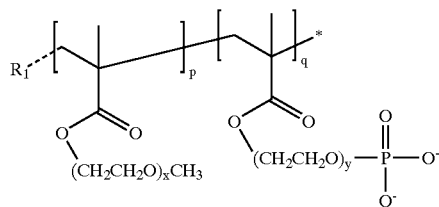

wherein;

R$_1$ is a polymer chain containing monomers selected from the group consisting of ethylenically unsaturated monomers and vinylaromatic hydrocarbon monomers, and mixtures thereof;

p and q are from 1 to 100; and x and y are from 5 to 50.

26. An acrylic emulsion dispersant as set forth in claim 25 wherein said ethylenically unsaturated monomers are selected from the group consisting of compounds consisting of aliphatic acrylates, aliphatic methacrylates, cycloaliphatic acrylates, cycloaliphatic methacrylates, and mixtures thereof, each of said compounds having up to 20 carbon atoms in the alkyl radical.

27. An acrylic emulsion dispersant as set forth in claim 26 wherein said aliphatic acrylates are selected from the group consisting of methyl acrylate, ethyl acrylate, propyl acrylate, butyl acrylate, hexyl acrylate, ethylhexyl acrylate, stearyl acrylate, lauryl acrylate, and mixtures thereof.

28. An acrylic emulsion dispersant as set forth in claim 26 wherein said aliphatic methacrylates are selected from the group consisting of methyl methacrylate, ethyl methacrylate, propyl methacrylate, butyl methacrylate, hexyl methacrylate, ethylhexyl methacrylate, stearyl methacrylate, lauryl methacrylate, and mixtures thereof.

29. An acrylic emulsion dispersant as set forth in claim 25 wherein said vinylaromatic hydrocarbon monomers are selected from the group consisting of styrene, α-methylstyrene, vinyltoluene, diphenylethylene, and mixtures thereof.

30. An acrylic emulsion dispersant as set forth in claim 25 wherein $R_1$ is further defined as

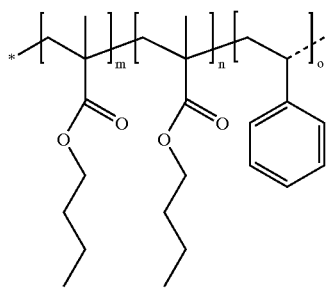

wherein;

m, n, and o are from 1 to 100.

31. A water-based acrylic emulsion dispersant for efficient wetting and grinding of a pigment, said acrylic emulsion dispersant comprising the reaction product of:

an ethylenically unsaturated monomer;

a vinylaromatic hydrocarbon monomer;

a non-functional monomer selected from the group consisting of non-functional polyalkylene glycol methacrylate monomers and non-functional polyalkylene glycol acrylate monomers;

a functional monomer selected from the group consisting of functional polyalkylene glycol methacrylates having a hydroxyl group and functional polyalkylene glycol acrylate monomers having a hydroxyl group; and an acid having a first functional acid group reactive with said hydroxyl group, and a second functional acid group capable of providing an acid anion group.

* * * * *